US010071369B2

(12) United States Patent
Otsuki et al.

(10) Patent No.: US 10,071,369 B2
(45) Date of Patent: Sep. 11, 2018

(54) METHOD OF MAKING A PARTICULATE FILTER CARRY A CATALYST

(71) Applicant: TOYOTA JIDOSHA KABUSHIKI KAISHA, Toyota-shi, Aichi (JP)

(72) Inventors: Hiroshi Otsuki, Gotenba (JP); Hiromasa Nishioka, Susono (JP); Kazuhiro Ito, Mishima (JP); Daichi Imai, Sunto-gun (JP); Yoshihisa Tsukamoto, Susono (JP); Yasumasa Notake, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 15/324,394

(22) PCT Filed: May 11, 2015

(86) PCT No.: PCT/JP2015/002387
§ 371 (c)(1),
(2) Date: Jan. 6, 2017

(87) PCT Pub. No.: WO2016/006146
PCT Pub. Date: Jan. 14, 2016

(65) Prior Publication Data
US 2017/0157602 A1   Jun. 8, 2017

(30) Foreign Application Priority Data

Jul. 7, 2014   (JP) .................................. 2014-139775

(51) Int. Cl.
*B01J 37/03* (2006.01)
*B01D 53/92* (2006.01)
(Continued)

(52) U.S. Cl.
CPC ........ *B01J 37/0215* (2013.01); *B01D 53/885* (2013.01); *B01D 53/92* (2013.01);
(Continued)

(58) Field of Classification Search
CPC .................. B01J 37/0215; B01J 37/0219; B01J 37/0221; B01J 37/0236; B01J 2255/9155;
(Continued)

(56) References Cited

U.S. PATENT DOCUMENTS 3,498,927 A * 3/1970 Stiles .................. B01J 37/00
252/634
2003/0162650 A1   8/2003 Marques et al.
(Continued)

FOREIGN PATENT DOCUMENTS

CN   102151564 A * 8/2011
JP   2007-38139   2/2007
(Continued)

OTHER PUBLICATIONS

Definition of "specific" retrieved from https://www.google.com on Oct. 29, 2017, 1 page. (Year: 2017).*
(Continued)

*Primary Examiner* — William P Fletcher, III
(74) *Attorney, Agent, or Firm* — Finnegan, Henderson, Farabow, Garrett & Dunner LLP (57) ABSTRACT

A gel which contains a component of a catalyst is prepared. The gel and another gel are arranged in layers at a position which faces open ends of exhaust flow passages of a wall flow-type particulate filter. Next, a pusher is used to push and pack the gel and other gel through the open ends to the insides of the exhaust flow passages. Next, the particulate filter is made to dry to thereby make the partition walls carry the catalyst on their surfaces or in their micropores.

9 Claims, 9 Drawing Sheets

(51) Int. Cl.
   *B01J 37/02* (2006.01)
   *F01N 3/022* (2006.01)
   *F01N 3/035* (2006.01)
   *B01D 46/24* (2006.01)
   *B01D 46/00* (2006.01)
   *B05D 7/22* (2006.01)
   *B01D 53/88* (2006.01)
   *B01D 53/94* (2006.01)

(52) U.S. Cl.
   CPC .......... *B01D 53/94* (2013.01); *B01J 37/0219* (2013.01); *B01J 37/0221* (2013.01); *B01J 37/0236* (2013.01); *B01J 37/0244* (2013.01); *B05D 7/22* (2013.01); *F01N 3/0222* (2013.01); *F01N 3/035* (2013.01); *B01D 2255/902* (2013.01); *B01D 2255/9155* (2013.01); *F01N 2230/00* (2013.01); *F01N 2330/06* (2013.01)

(58) Field of Classification Search
   CPC .. B01J 2255/902; B01D 53/885; B01D 53/92; B01D 53/94; F01N 3/0222; F01N 2230/00; F01N 2230/34; F01N 2230/36; B05D 7/22
   USPC .................................................. 427/230–239
   See application file for complete search history.

(56) References Cited

U.S. PATENT DOCUMENTS

| | | | |
|---|---|---|---|
| 2007/0107705 A1* | 5/2007 | Hoke | F02M 25/0854 123/568.11 |
| 2010/0135866 A1 | 6/2010 | Mizuno et al. | |
| 2011/0268624 A1* | 11/2011 | Chandler | A44B 13/0011 422/222 |

FOREIGN PATENT DOCUMENTS

| | | |
|---|---|---|
| JP | 2007-144359 | 6/2007 |
| JP | 2009-160547 | 7/2009 |

OTHER PUBLICATIONS

Sax, N. I., Lewis, Sr., R. J., Eds.; Hawley's Condensed Chemical Dictionary, 11th Edition; Van Nostrand Reinhold: New York, 1987, pp. 555 and 1047. (Year: 1987).*

* cited by examiner

METHOD OF MAKING A PARTICULATE FILTER CARRY A CATALYST

CROSS-REFERENCE TO RELATED APPLICATIONS

This application is a national phase application of International Application No. PCT/JP2015/002387, filed May 11, 2015, and claims the priority of Japanese Application No. 2014-139775, filed Jul. 7, 2014, the content of both of which is incorporated herein by reference.

BACKGROUND

Technical Field

The present invention relates to a method of making a particulate filter carry a catalyst.

Background Art

A wall flow-type particulate filter is known in the art which is adapted to be arranged inside an exhaust passage of an internal combustion engine for trapping particulate matter which is contained in exhaust gas. Such a wall flow-type particulate filter is provided with a plurality of exhaust flow passages which are alternately arranged across porous partition walls. The exhaust flow passages are comprised of exhaust gas inflow passages with upstream ends which are open ends and with downstream ends which are closed ends and exhaust gas outflow passages with upstream ends which are closed ends and with downstream ends which are open ends. The wall flow-type particulate filter further carries a catalyst at the partition walls on their surfaces or inside their micropores.

Further, a method of making a particulate filter carry a catalyst is known in the art, in which a slurry which contains a catalyst is prepared, next the open ends of the exhaust gas inflow passages is immersed in the slurry, next the slurry is sucked from the open ends of the exhaust gas outflow passages to thereby apply the slurry to the insides of the micropores of the partition walls, and next the particulate filter is dried and fired (for example, see PTL 1).

PTL 1

Japanese Patent Publication No. 2009-160547A

SUMMARY

However, if, like in PTL 1, the slurry is sucked to thereby apply the slurry to the insides of the micropores of the partition walls, the slurry will be applied to the partition walls as a whole. As a result, the catalyst will end up being carried at the partition walls as a whole. That is, in PTL 1, it is not possible to make only parts of the partition walls carry the catalyst. In other words, there is the problem of a low degree of freedom in application of the catalyst on the partition walls.

According to the present invention, there is provided a method of making a particulate filter carry a catalyst, the particulate filter being adapted to be arranged in an exhaust passage of an internal combustion engine for trapping particulate matter which is contained in exhaust gas, the particulate filter comprising a plurality of exhaust flow passages which extend in parallel with each other and porous partition walls which separate these exhaust flow passages from each other, the exhaust flow passages comprising first exhaust flow passages with specific ends in the longitudinal direction which are open ends and with other ends in the longitudinal direction which are closed ends and second exhaust flow passages with specific ends in the longitudinal direction which are closed ends and other ends in the longitudinal direction which are open ends, the method comprising: preparing a gel which contains a component of the catalyst; next applying the gel to the partition walls; and next making the particulate filter dry to thereby make the partition walls carry the catalyst on their surfaces or in their micropores.

It is possible to raise the degree of freedom of application of a catalyst at partition walls.

DETAILED DESCRIPTION

Figure 1:
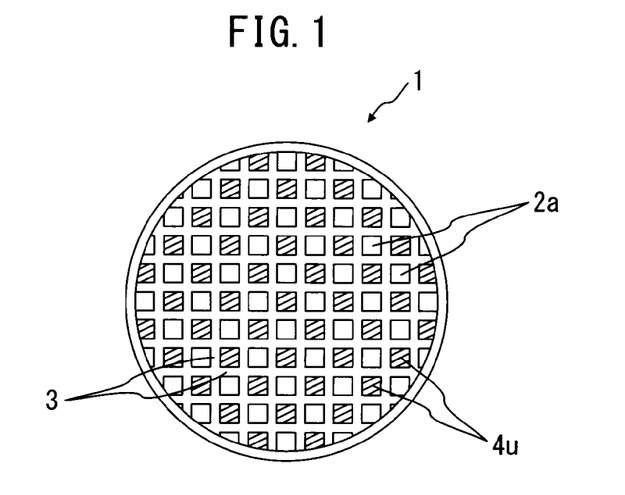
FIG. 1 is a front view of a particulate filter.
Figure 2:
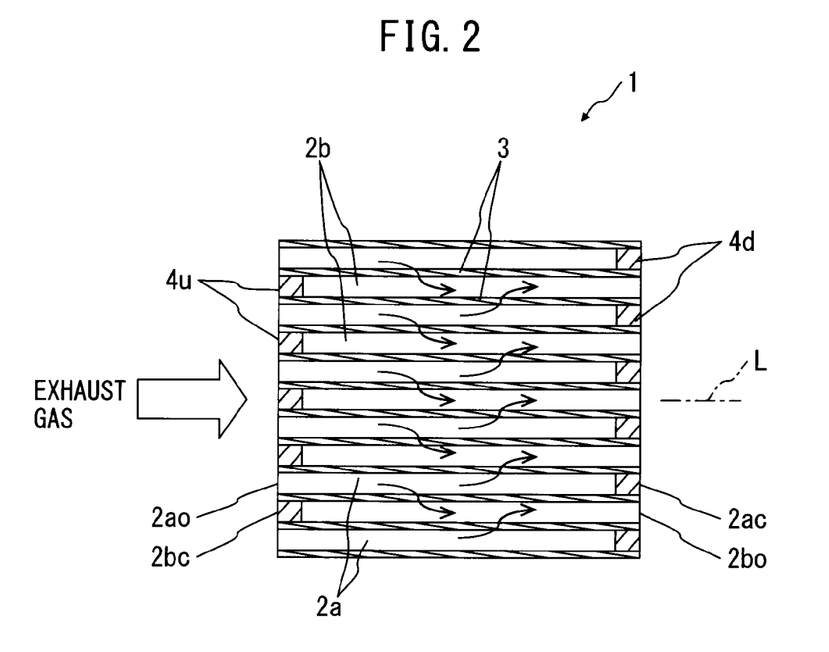
FIG. 2 is a side cross-sectional view of a particulate filter.

FIG. 1 and FIG. 2 show a structure of a wall flow-type particulate filter 1. Note that, FIG. 1 shows a front view of the particulate filter 1, while FIG. 2 shows a side cross-sectional view of the particulate filter 1. As shown in FIG. 1 and FIG. 2, the particulate filter 1 forms a honeycomb structure comprised of a plurality of exhaust flow passages 2a, 2b which extend in parallel with each other in a longitudinal direction L of the particulate filter 1 and porous partition walls 3 which separate these exhaust flow passages 2a, 2b from each other. In the embodiment which is shown in FIG. 1 and FIG. 2, the exhaust flow passages 2a, 2b are comprised of first exhaust flow passages 2a and second exhaust flow passages 2b. Specific ends of the first exhaust flow passages 2a in the longitudinal direction L are open ends 2ao, while the other ends in the longitudinal direction L are closed by the stoppers 4d and therefore are closed ends 2ac. On the other hand, specific ends of the second exhaust flow passages 2b in the longitudinal direction L are closed by the stoppers 4u and therefore are closed ends 2bc, while the other ends in the longitudinal direction L are open ends 2bo. Note that, in FIG. 1, hatched parts show stoppers 4u. Therefore, the first exhaust flow passages 2a and the second exhaust flow passages 2b are alternately arranged through thin partition walls 3. In other words, the first exhaust flow passages 2a and the second exhaust flow passage 2b are arranged so that each first exhaust flow passage 2a is surrounded by four second exhaust flow passages 2b and so that each second exhaust flow passage 2b is surrounded by four first exhaust flow passages 2a.

The particulate filter 1 is adapted to be arranged in an exhaust passage of an internal combustion engine so as to trap particulate matter which is contained in exhaust gas. In this case, the particulate filter 1 is arranged in the exhaust passage so that the open ends 2ao of the first exhaust flow passages 2a and the closed ends 2bc of the second exhaust flow passages 2b are positioned upstream in the flow of exhaust gas and so that the closed ends 2ac of the first exhaust flow passages 2a and open ends 2bo of the second exhaust flow passages 2b are positioned downstream in the flow of exhaust gas. As a result, as shown in FIG. 2 by the arrow marks, the exhaust gas first flows into the first exhaust flow passages 2a and next passes through the surrounding partition walls 3 to flow out into the adjoining exhaust flow passages 2b.

The partition walls 3 are formed from a porous material such as cordierite, silicon carbide, silicon nitride, zirconia, titania, alumina, silica, mullite, lithium aluminum silicate, zirconium phosphate, and other such ceramics.

Micropore diameter of the partition walls 3 can be set to various values as long as it is possible to trap the particulate matter which is mainly comprised of solid carbon in the exhaust gas. In one embodiment, the micropore diameter of the partition walls 3 is set to 20 μm or less, preferably 10 to 20 μm or so. If doing this, the particulate matter is reliably trapped by the particulate filter 1. In another embodiment, the micropore diameter of the partition walls 3 is set to 40 μm or more, preferably 40 to 75 μm or so. It is confirmed by the present inventors that if doing this, almost all of an ash which is contained in the exhaust gas can pass through the partition walls 3. Note that, "ash" comprises unburnable components which are contained in exhaust gas and is mainly formed from calcium sulfate $CaSO_4$, calcium zinc phosphate $Ca_{19}Zn_2(PO_4)_{14}$, and other calcium salts. Further, in still another embodiment, parts of the partition walls 3, for example, the upstream side parts, are set to have micropore diameters of 20 μm or less, preferably 10 to 20 μm or so, while the remaining parts of the partition walls 3, for example, the downstream side parts, are set to have micropore diameters of 40 μm or more, preferably 40 to 75 μm or so. Note that, in the embodiments according to the present invention, the "micropore diameter (median diameter)" means a median diameter (50% diameter) in a distribution of micropore diameters which are obtained by the mercury penetration method.

Furthermore, the partition walls 3 carry the catalyst on their surfaces or inside the micropores of the partition walls 3. The catalyst is formed from a catalyst which has an oxidation function, a catalyst which has an $NO_x$ reducing function, etc.

Figure 3:
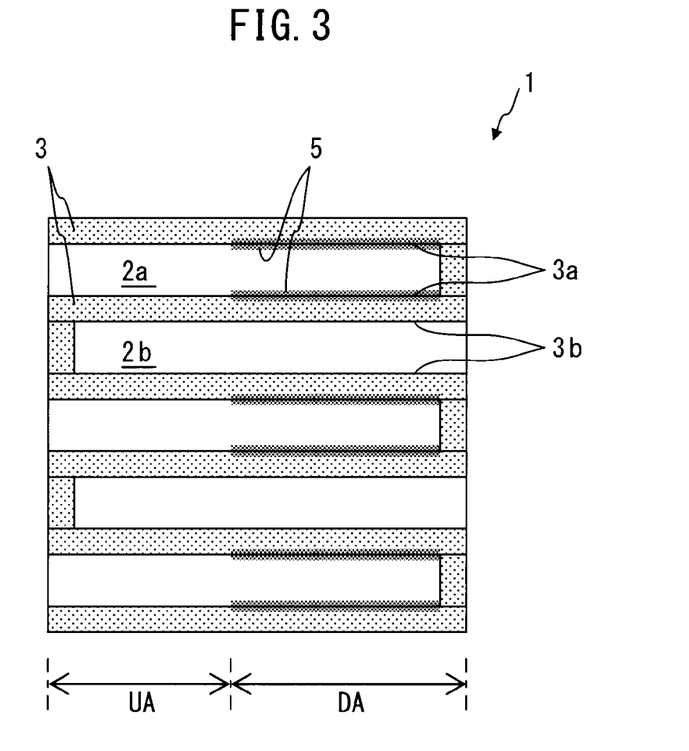
FIG. 3 is a schematic view of a first embodiment of a particulate filter.

FIG. 3 schematically shows a first embodiment of the particulate filter 1. In the first embodiment, the catalyst 5 is carried on the surfaces 3a of the partition walls 3 which face the first exhaust flow passages 2a and is not carried on the surfaces 3b of the partition walls 3 which face the second exhaust flow passages 2b. In particular, the catalyst 5 is carried on the parts of the partition wall surfaces 3a which are positioned in a downstream side area DA and is not carried on the parts which are positioned inside an upstream side area UA. Note that, in the first embodiment, the partition walls 3 also carry the catalyst 5 inside their micropores. The catalyst 5 is provided with a porous carrier and at least one type of catalyst component which is carried on that carrier. In one embodiment, the carrier is comprised of for example alumina $Al_2O_3$ and the catalyst component is comprised of for example platinum particles.

In the first embodiment, the particulate filter 1 is produced in the following way. That is, first, a slurry which contains the catalyst component, a carrier material, a binder and water, is prepared. Here, the carrier material finally forms the above-mentioned carrier. Next, this slurry is given a gel agent whereby a gel G which contains the catalyst component is prepared.

Further, another gel GA different from the gel G is prepared. In the first embodiment, the other gel GA does not contain the above-mentioned catalyst component, carrier material, and binder.

Figure 4:
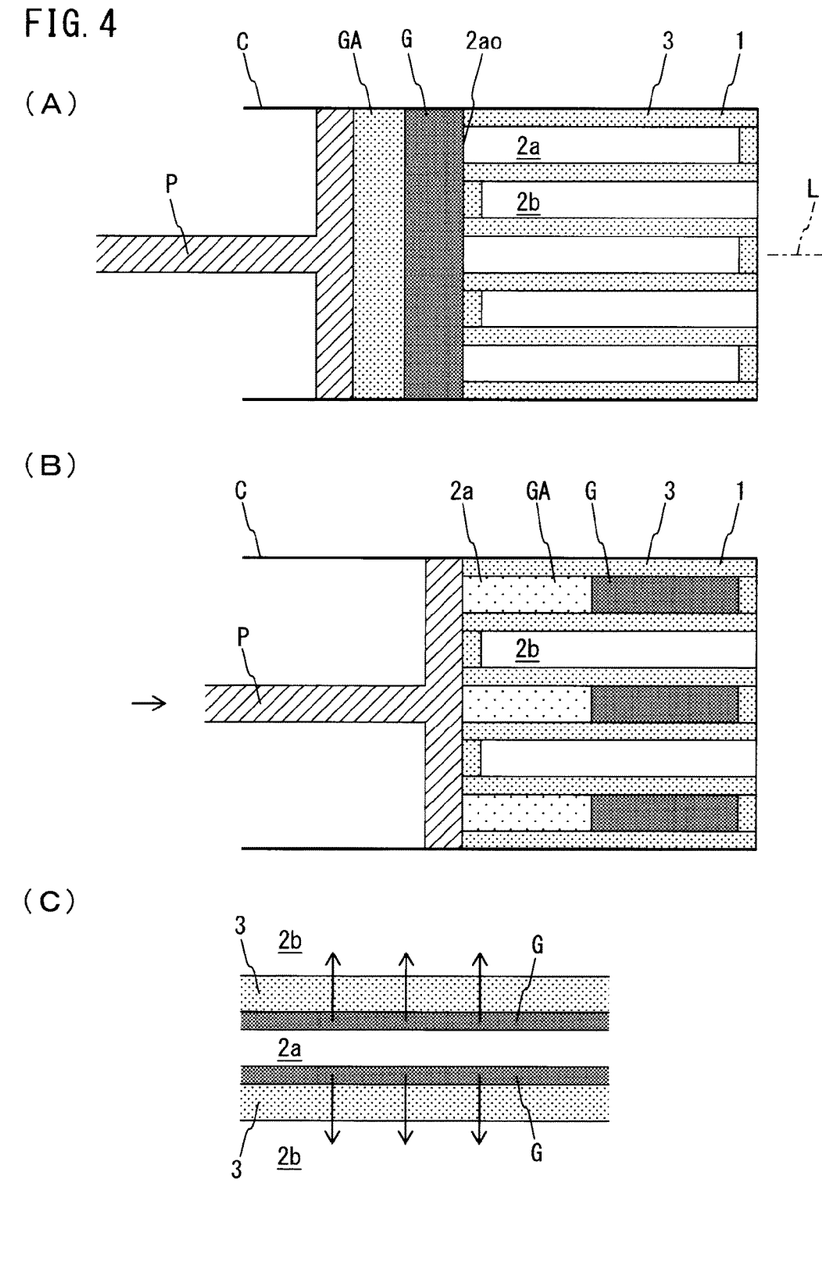
FIG. 4 is a schematic view which explains a method of carrying a catalyst of the first embodiment.

On the other hand, as shown in FIG. 4(A), the particulate filter 1 is housed without clearance inside a cylindrical member C with two open ends. Next, the above-mentioned gel G and other gel GA are arranged at a position which faces the open ends 2ao of the first exhaust flow passages 2a in the cylindrical member C. In this case, in the first embodiment, the gel G and other gel GA are arranged in layers in the longitudinal direction L of the particulate filter 1. Specifically, the gel G is arranged at the side close to the particulate filter in the longitudinal direction of the particulate filter 1 while the other gel GA is arranged at the side far from the particulate filter 1.

Next, as shown in FIG. 4(B), a pusher P which can move inside the cylindrical member C without clearance is used to push the gel G and other gel GA through the open ends 2ao of the first exhaust flow passages 2a into the insides of the first exhaust flow passages 2a whereby the first exhaust flow passages 2a as a whole are filled with the gel G and other gel GA. In the first embodiment, the gel G and other gel GA are applied to the partition walls 3 in this way.

Next, the particulate filter 1 is taken out from the cylindrical member C and is heated under reduced pressure so as to be dried. In this case, the moisture which is contained in the gel G and other gel GA, as shown in FIG. 4(C) by the arrow marks, passes through the partition walls 3 to reach the second exhaust flow passages 2b where it is removed from the particulate filter 1. Along with this movement of moisture, the gel G moves on the surfaces or inside the micropores of the partition walls 3. Next, sintering process is carried out. As a result, the catalyst 5 is carried on the surfaces or in the micropores of the partition walls 3. Note that, when drying the particulate filter 1, if closing the end faces of the particulate filter 1 at the open end 2ao sides of the first exhaust flow passages 2a, a flow of moisture from the first exhaust flow passages 2a through the partition wall 3 toward the second exhaust flow passages 2b is promoted.

In another embodiment which is not shown, the other gel GA is arranged at the side close to the particulate filter in the longitudinal direction L of the particulate filter 1 while the gel G is arranged at the side far from the particulate filter 1. In this case, the catalyst 5 is not carried on the parts of the partition wall surfaces 3a which are positioned in the downstream side area DA, but is carried on the parts which are positioned in the upstream side area UA.

Further, in a still other embodiment which is not shown, the gel G is arranged at a position which faces the open ends 2bo of the second exhaust flow passages 2b and is pushed into the second exhaust flow passages 2b. In this case, the catalyst 5 is carried on the surfaces 3b of the partition walls 3 which face the second exhaust flow passages 2b.

In this way, by just changing the position of the gel G before pushing it into the exhaust flow passages 2a, 2b, it is possible to easily change the arrangement of the catalyst 5 at the partition walls 3. Therefore, the degree of freedom of application of the catalyst 5 at the partition walls 3 is enhanced.

Further, the length of the downstream side area DA where the catalyst 5 is carried and the length of the upstream side area UA where the catalyst 5 is not carried are determined in accordance with the amount of the gel A and the amount of the other gel GA which are to be pushed into the exhaust flow passages 2*a*. If taking the opposite viewpoint, by controlling the amount of the gel A and the amount of the other gel GA, the length of the downstream side area DA and the length of the upstream area UA are controlled.

In this regard, in the known art of immersing the particulate filter in a slurry and then sucking in an excess slurry, it is necessary to prepare amounts of the catalyst component, carrier material, and binder which are greater than amounts of the catalyst component etc. which are required for forming the catalyst. As opposed to this, in the first embodiment, after the gel G and other gel GA are applied to the partition walls 3, no suction action is performed. As a result, all of the catalyst component, carrier material, and binder which are contained in the gel G is utilized for forming the catalyst 5. Therefore, the catalyst component etc. can be effectively utilized. On this point, there is also the view that it is sufficient that amounts of the catalyst component, carrier material, and binder which are necessary for forming the catalyst 5 be contained in the gel G and that removal of an excess catalyst component etc. is no needed. Note that, as stated above, in the first embodiment, after the gel G is applied to the partition walls 3, the particulate filter 1 is heated under reduced pressure. The reduced pressure in this case is to promote drying. It cannot remove the excess slurry and differs in nature from the suction action of the known art.

Figure 5:
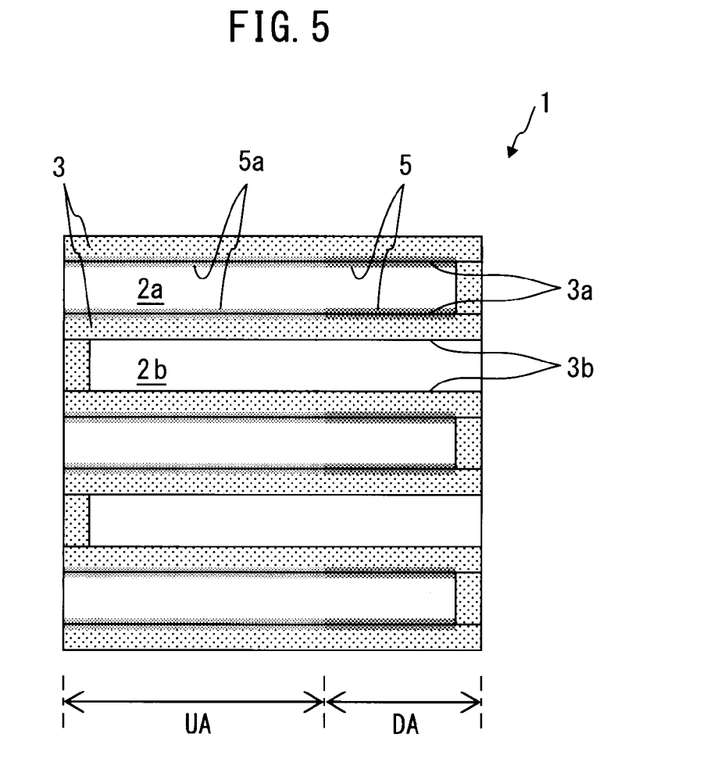
FIG. 5 is a schematic view of a second embodiment of a particulate filter.

FIG. 5 schematically shows a second embodiment of the particulate filter 1. In the second embodiment, the catalyst 5 is carried on the parts of the partition wall surfaces 3*a* which face the first exhaust flow passages 2*a* which are positioned in the downstream side area DA, while another catalyst 5*a* is carried on the parts of the partition wall surfaces 3*a* which are positioned in the upstream side area UA. Note that, in the second embodiment, the catalyst 5 and other catalyst 5*a* are not carried on the surfaces 3*b* of the partition walls 3 which face the second exhaust flow passages 2*b*. The catalyst component of the other catalyst 5*a* differs from the catalyst component of the catalyst 5. Alternatively, the catalyst component of the other catalyst 5*a* is the same as the catalyst component of the catalyst 5, but the amount per unit volume of the partition walls differs.

The catalyst carrying method in the second embodiment differs from the catalyst carrying method in the first embodiment on the following point. That is, a slurry which contains the catalyst component of the other catalyst 5*a*, a carrier material, a binder and water, is prepared, and this slurry is then gelled whereby another gel GA which contains the other catalyst component is prepared. Next, as shown in FIG. 6(A), the above-mentioned gel G and other gel GA are arranged at a position which faces the open ends 2*ao* of the first exhaust flow passages 2*a* in the cylindrical member C. In this case, the gel G is arranged at the side close to the particulate filter 1 in the longitudinal direction L of the particulate filter 1 while the other gel GA is arranged at the side far from the particulate filter 1. Next, as shown in FIG. 6(B), a pusher P is used to push the gel G and other gel GA into the first exhaust flow passages 2*a* whereby the first exhaust flow passages 2*a* as a whole are filled with the gel G and other gel GA. Next, the particulate filter 1 is taken out from the cylindrical member C and is heated under reduced pressure so as to be dried, and sintering is then performed.

Figure 6:
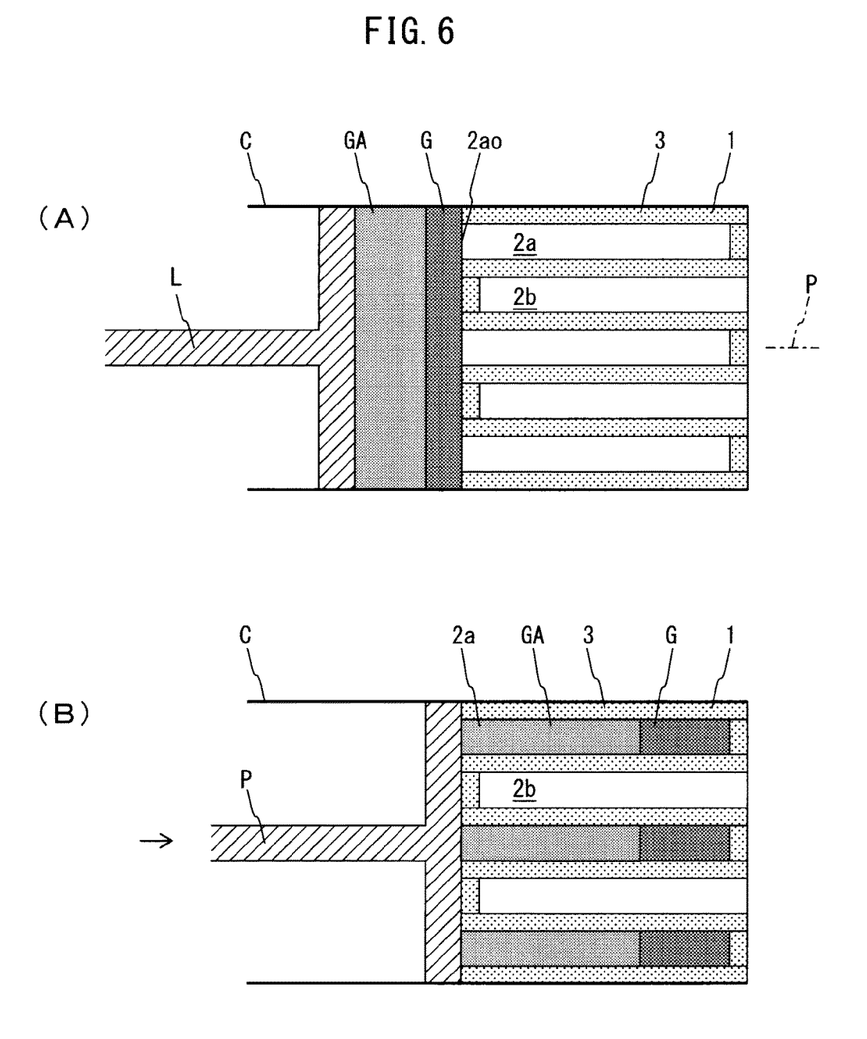
FIG. 6 is a schematic view which explains a method of carrying a catalyst of the second embodiment.

Note that, if focusing on the gel G, the gel G contains the component of the catalyst 5 and does not contain the component of other catalyst 5*a*. On the other hand, if focusing on the other gel GA, the other gel GA contains the component of the other catalyst 5*a* and does not contain the component of the catalyst 5.

Figure 7:
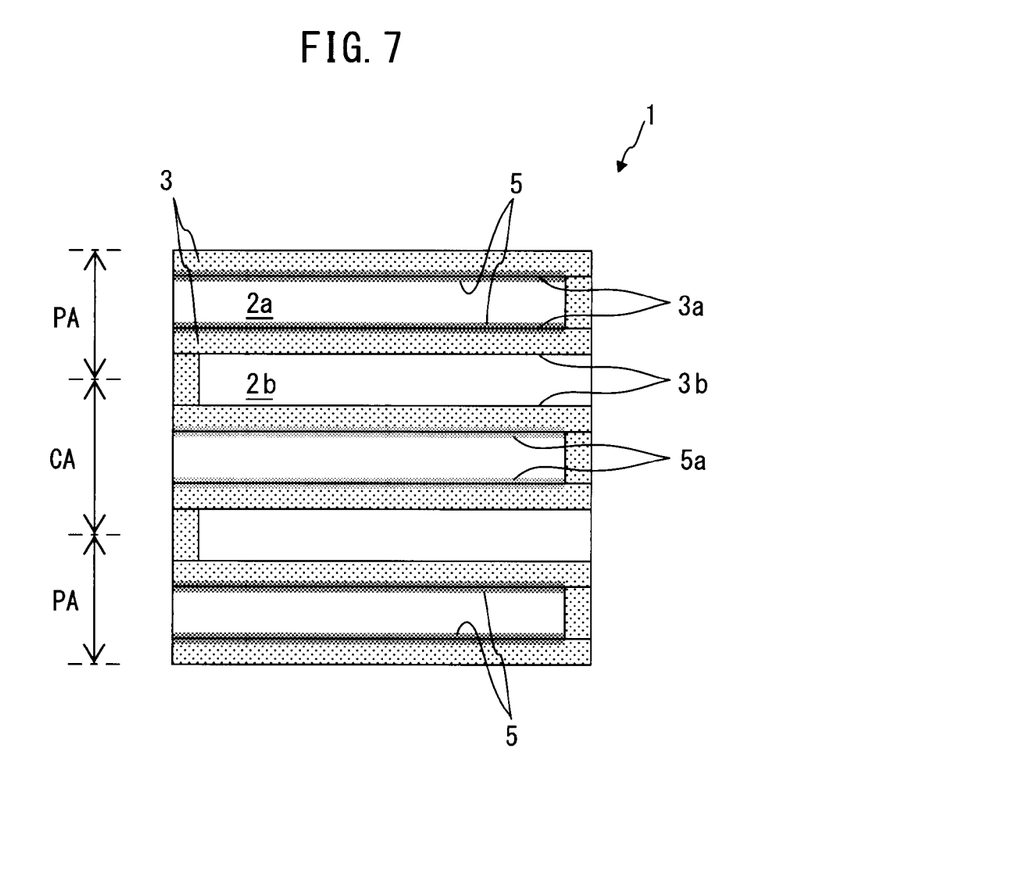
FIG. 7 is a schematic view of a third embodiment of a particulate filter.

FIG. 7 schematically shows a third embodiment of the particulate filter 1. In the third embodiment, the catalyst 5 is carried on the partition wall surfaces 3*a* which face the first exhaust flow passage 2*a* which are positioned in a peripheral area PA in a radial direction of the particulate filter 1, while the other catalyst 5*a* is carried on the partition wall surfaces 3*a* which are positioned in a center area CA in the radial direction of the particulate filter 1. Note that, in the third embodiment, the catalyst 5 and the other catalyst 5*a* are not carried on the partition walls 3 which face the second exhaust flow passages 2*b*.

Figure 8:
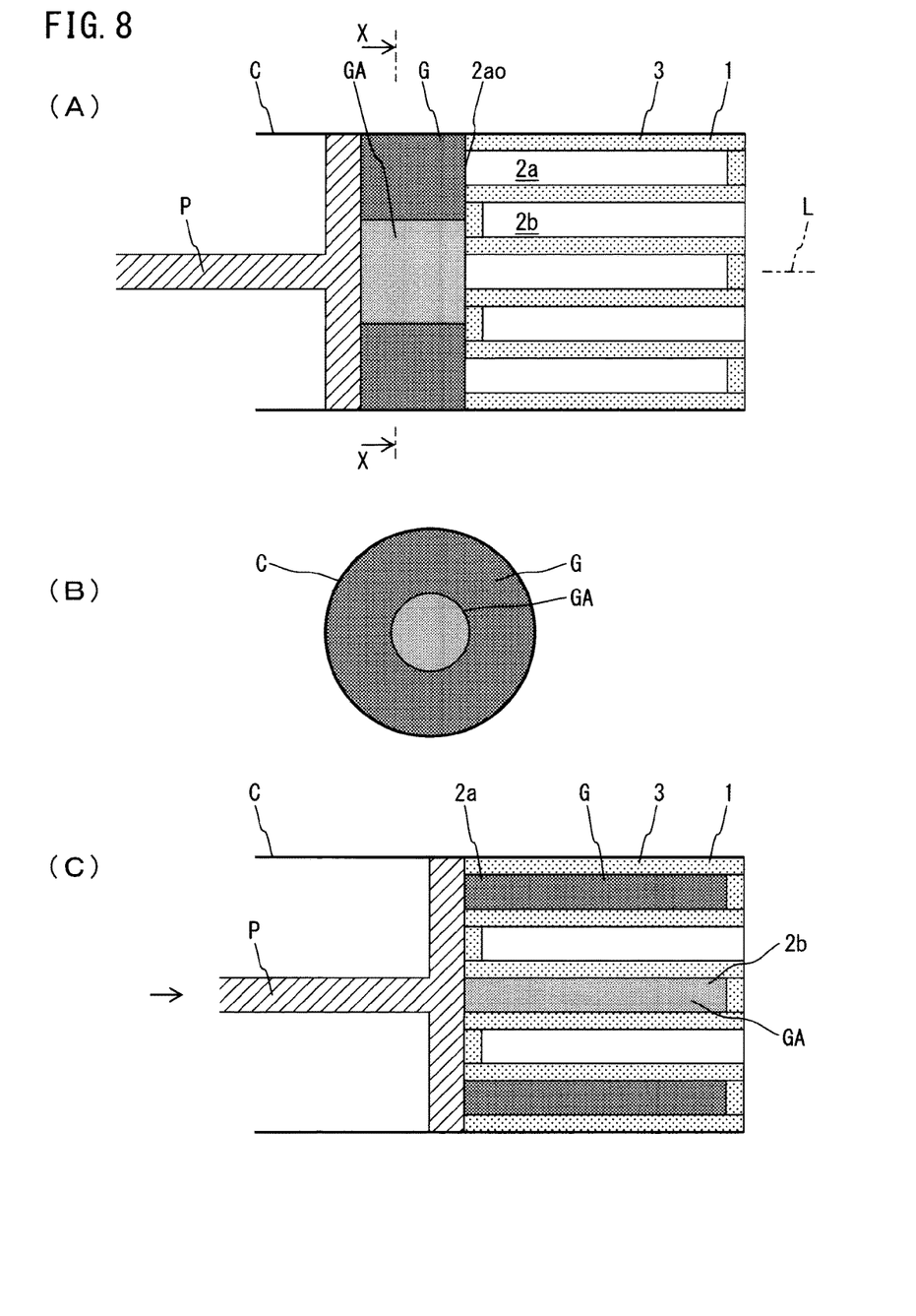
FIG. 8 is a schematic view which explains a method of carrying a catalyst of the third embodiment.

The catalyst carrying method in the third embodiment differs from the catalyst carrying method in the second embodiment in the following point. That is, as shown in FIG. 8(A) and FIG. 8(B), the above-mentioned gel G and other gel GA are arranged at a position which faces the open ends 2*ao* of the first exhaust flow passages 2*a* in the cylindrical member C. In this case, gel G and other gel GA are arranged in layers in the radial direction of the particulate filter 1. Specifically, the gel G is arranged at the peripheral part of the particulate filter 1, while the other gel GA is arranged at the center part of the particulate filter 1. Next, as shown in FIG. 8(C), a pusher P is used to push the gel G and the other gel GA into the first exhaust flow passages 2*a* whereby the insides of the first exhaust flow passages 2*a* as a whole are filled with the gel G and other gel GA. Next, the particulate filter 1 is taken out from the cylindrical member C, is then heated under reduced pressure to be dried, and sintering is then performed. Note that, FIG. 8(B) is a cross-sectional view along the line X-X of FIG. 8(A).

In another embodiment which is not shown, the gel G is arranged at the center part of the particulate filter 1 while the other gel GA is arranged at the peripheral part of the particulate filter 1. As a result, the catalyst 5 is carried on the partition wall surfaces 3*a* which are positioned in the center area CA, while the other catalyst 5*a* is carried on the partition wall surfaces 3*a* which are positioned in the peripheral area PA. In a still another embodiment which is not shown, the other gel GA does not contain any catalyst component at all.

Further, in a still another embodiment which is not shown, a partition plate is provided which separates the gel G and the other gel GA which are arranged at a position which faces the open ends 2*ao* of the first exhaust flow passages 2*a*. If doing this, the gel G and the other gel GA are suppressed from mixing with each other. Note that, in this example, a pusher for the gel G and a pusher for the other gel GA are separately provided.

Figure 9:
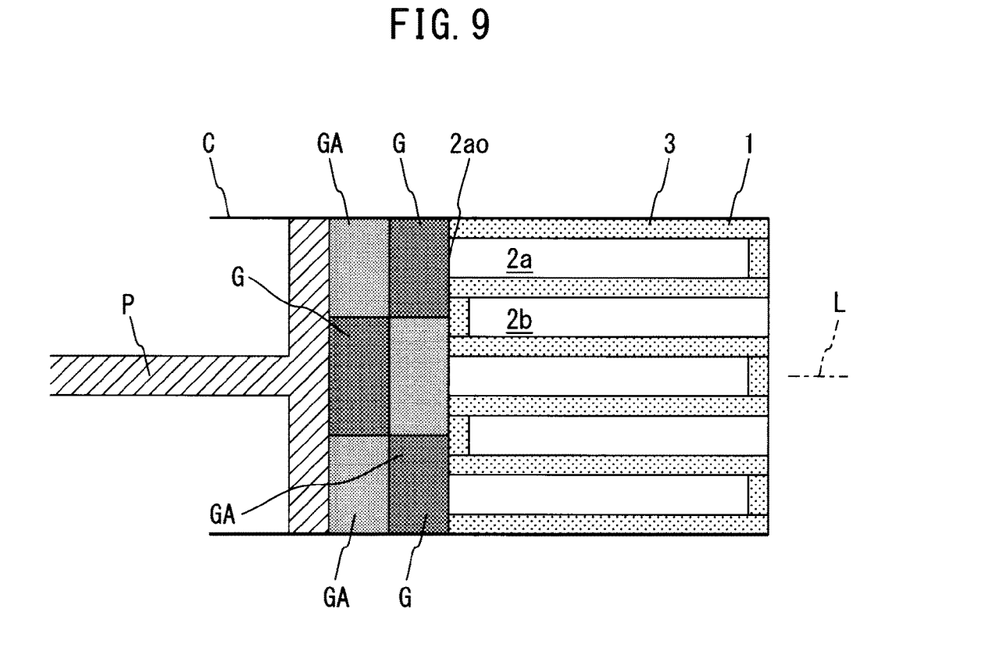
FIG. 9 is a schematic view which explains a method of carrying a catalyst of another embodiment.

In an embodiment which is shown in FIG. 9, the gel G and other gel GA are arranged in layers in the longitudinal direction L of the particulate filter 1 at a position which faces the open ends 2*ao* of the first exhaust flow passages 2 in the cylindrical member C and are arranged in layers in the radial direction of the particulate filter 1 as well. In this way, the catalyst 5 and the catalyst 5*a* can be made to be carried at any positions of the partition walls 3.

Figure 10:
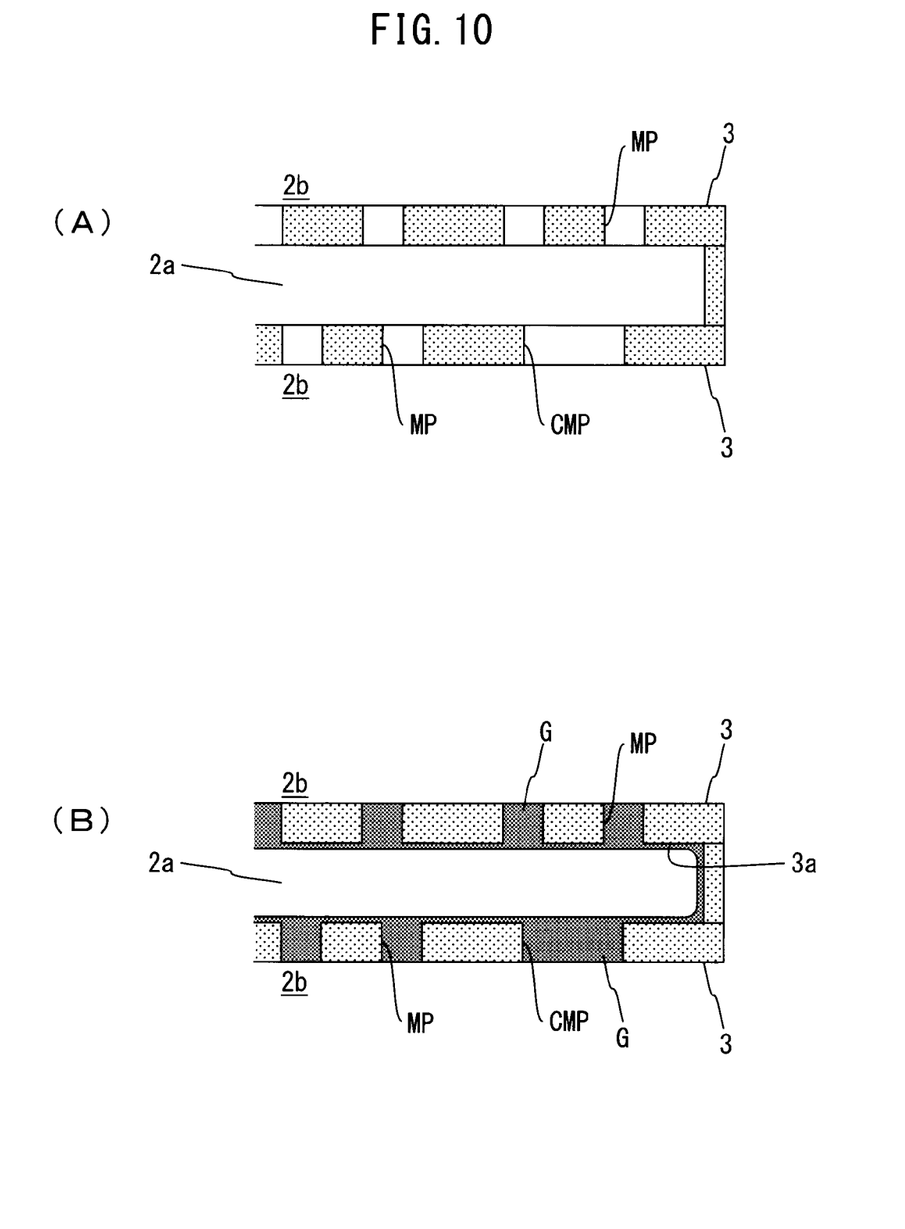
FIG. 10 is a partial enlarged schematic view of a particulate filter.

FIG. 10(A) schematically shows a particulate filter 1 in the case where the partition walls 3 have relatively large micropore diameters, for example, 40 µm or more. If the micropore diameter is large, the mutually adjoining micropores MP may connect with each other and large diameter micropores, that is, coarse micropores CMP, may be formed. Diameters of coarse micropores CMP may vary in accordance with the diameter of the micropores MP, but is for example 100 µm. In this regard, if there are coarse micropores CMP present in the partition walls 3, the particulate matter is liable to pass through the partition walls 3 through the coarse micropores CMP, that is, the particulate matter is liable to be unable to be trapped by the particulate filter 1. On the other hand, the catalyst 5 has porosity and gas permeability. This being so, if the catalyst 5 is at least partially formed inside the coarse micropores CMP, it is possible to suppress the particulate matter from passing through the particulate filter 1 without excessively raising the pressure loss of the particulate filter 1.

On this point, in the catalyst carrying methods of the different embodiments according to the present invention discussed up to here, if a gel G is applied to the partition walls 3, as shown in FIG. 10(B), the gel G is filled inside the micropores MP and inside the coarse micropores CMP. In other words, the insides of the micropores MP and the coarse micropores CMP are closed by the gel G. Next, the catalyst 5 is formed without any suction action. As a result, the catalyst 5 is reliably formed inside the micropores MP and at the coarse micropores CMP. As opposed to this, in the known art of applying slurry to a particulate filter, then sucking it in, the slurry which had been held in the coarse micropores CMP is liable to be removed from the coarse micropores CMP due to the suction action. For this reason, it was difficult to form the catalyst 5 inside the coarse micropores CMP.

In the embodiments of the present invention which were explained up to here, the gel G and the other gel GA, that is, two types of gels, were applied to the partition walls 3. In another embodiment which is not shown, one type or three or more types of gel are applied to the partition walls 3.

Further, in the embodiments of the present invention which were explained up to here, the gel G and other gel GA are applied to the partition walls 3 by a single pushing action. In another embodiment which is not shown, the gel G and the other GA are applied to the partition walls 3 by separate pushing actions.

REFERENCE NOTATIONS LIST 1. particulate filter
2a, 2b. exhaust flow passage
3. partition wall
5. catalyst
G. gel
GA. other gel

The invention claimed is:

1. A method of making a particulate filter carry a catalyst, said particulate filter being adapted to be arranged in an exhaust passage of an internal combustion engine for trapping particulate matter which is contained in exhaust gas, said particulate filter comprising a plurality of exhaust flow passages which extend in parallel with each other and porous partition walls which separate these exhaust flow passages from each other, said exhaust flow passages comprising first exhaust flow passages with specific ends in the longitudinal direction which are open ends and with other ends in the longitudinal direction which are closed ends and second exhaust flow passages with specific ends in the longitudinal direction which are closed ends and other ends in the longitudinal direction which are open ends, said method comprising:

preparing a slurry containing a component of said catalyst;

converting said slurry into a gel containing the component of said catalyst;

preparing another gel which is different from said gel;

next said gel and said other gel are arranged at a position which faces open ends of said exhaust flow passages;

next a pusher is used to push and pack said gel and said other gel through said open ends into said exhaust flow passages to thereby apply said gel and said other gel to said partition walls; and next making said particulate filter dry to thereby make said partition walls carry said catalyst on their surfaces or in their micropores.

2. The method according to claim 1, wherein said partition walls have a micropore diameter of 40 µm or more.

3. The method according to claim 2, wherein said partition walls have a micropore diameter of 40 µm to 75 µm.

4. The method according to claim 1, wherein said gel and said other gel are arranged in layers in the longitudinal direction of said particulate filter at a position which faces open ends of said exhaust flow passages.

5. The method according to claim 4, wherein said gel is arranged at a side close to said particulate filter in the longitudinal direction of said particulate filter and said other gel is arranged at a side far from said particulate filter.

6. The method according to claim 1, wherein said gel and said other gel are arranged in layers in the radial direction of said particulate filter at a position which faces open ends of said exhaust flow passages.

7. The method according to claim 1, wherein said other gel contains a component of another catalyst which is different from said catalyst.

8. The method according to claim 1, wherein said other gel does not contain a component of said catalyst.

9. The method according to claim 1, wherein said slurry contains a binder and carrier in addition to the component of said catalyst.

* * * * *